Dec. 17, 1935.  L. B. HARRIS  2,024,690
TIMED SEQUENCE DISTRIBUTING AND REGULATING APPARATUS
Filed Jan. 21, 1933  4 Sheets-Sheet 1

INVENTOR
LEONARD B. HARRIS
BY
*Gifford, Scull & Burgess*
ATTORNEYS

Dec. 17, 1935.     L. B. HARRIS     2,024,690
TIMED SEQUENCE DISTRIBUTING AND REGULATING APPARATUS
Filed Jan. 21, 1933     4 Sheets-Sheet 3

INVENTOR.
LEONARD B. HARRIS
BY
*Gifford, Scull & Burgess*
ATTORNEYS.

Patented Dec. 17, 1935

2,024,690

UNITED STATES PATENT OFFICE 2,024,690

TIMED SEQUENCE DISTRIBUTING AND REGULATING APPARATUS

Leonard B. Harris, Bayside, Long Island, N. Y., assignor to International Oil Gas Corporation, New York, N. Y., a corporation of Delaware Application January 21, 1933, Serial No. 652,821

7 Claims. (Cl. 137—146)

This invention relates to an apparatus in which a liquid may be received through a single inlet and distributed or subdivided into a plurality of outlets in regulated quantities and in a timed sequence.

In carrying out this invention a liquid distributing apparatus is provided which may have a single inlet and a housing. The housing has a plurality of radial outlet passages terminating in axial apertures. A disk member may also be provided having a number of axial apertures adapted to register with the axial apertures in the housing, so that a limited rotary displacement of the disk member will regulate the flow of liquid between the inlet and the outlets from zero to maximum.

In an embodiment of the invention a liquid distributing apparatus is provided which comprises a housing having a plurality of radial outlets terminating in axial apertures, in combination with a disk member having an equal number of axial apertures and adapted for limited rotary displacement for regulating the flow of the liquid to the outlets, together with a rotary member having a single inlet and a lesser number of axial apertures which may be caused to register with the other apertures in succession whereby measured quantities of liquid under pressure will be supplied to groups of said outlets in a timed sequence or in rotation.

Figure 1:
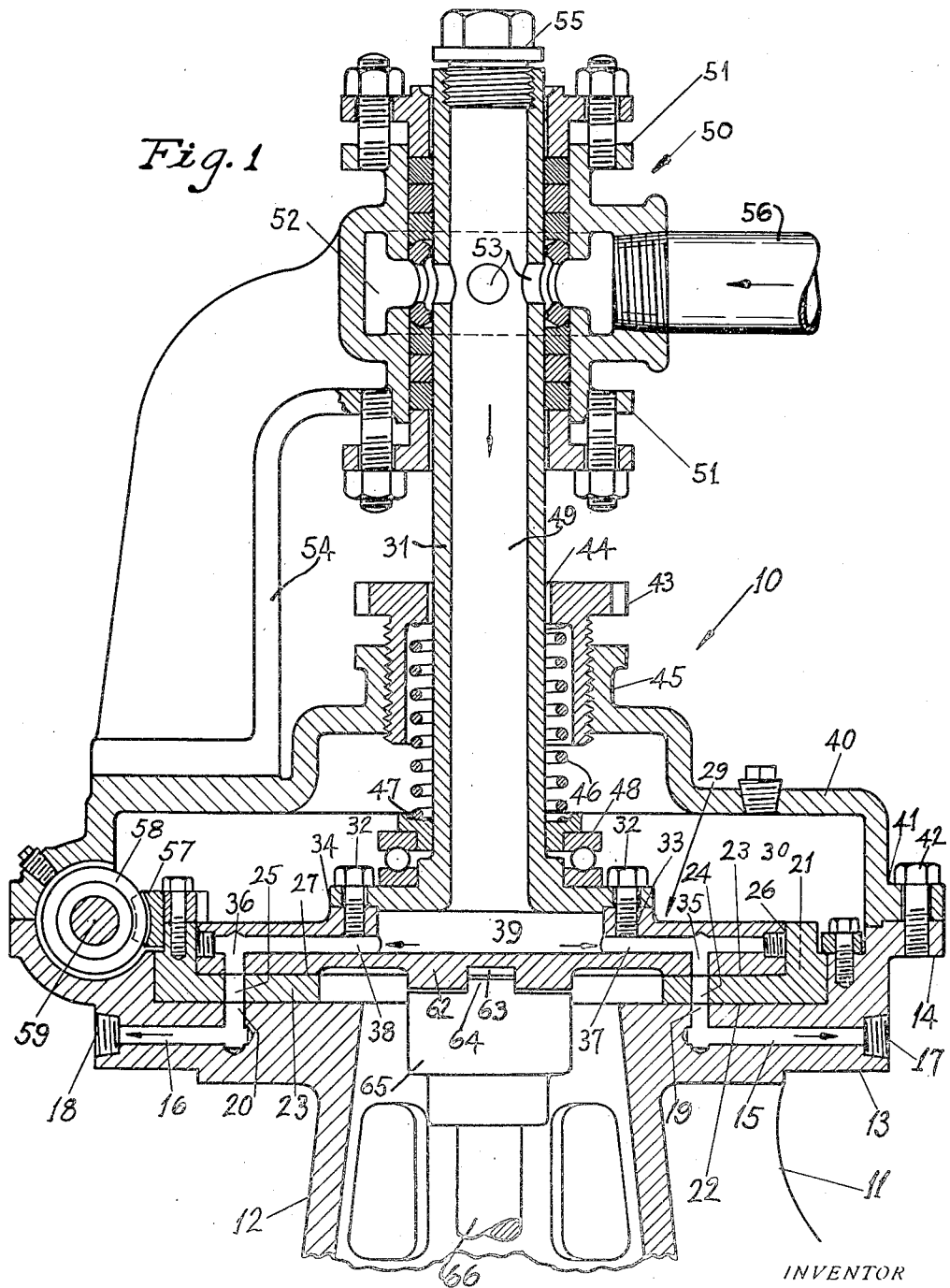
Figure 2:
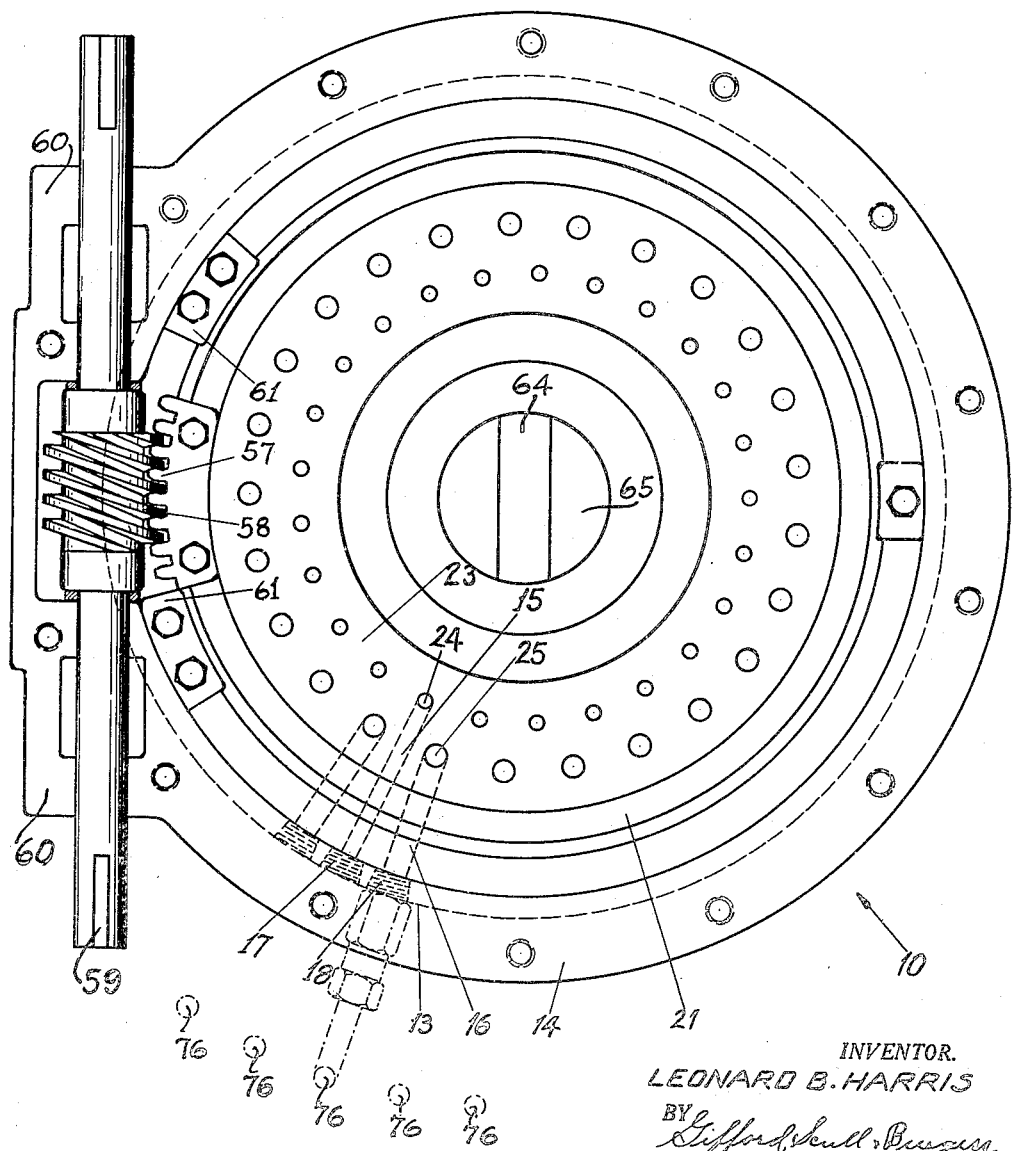
Figure 3:
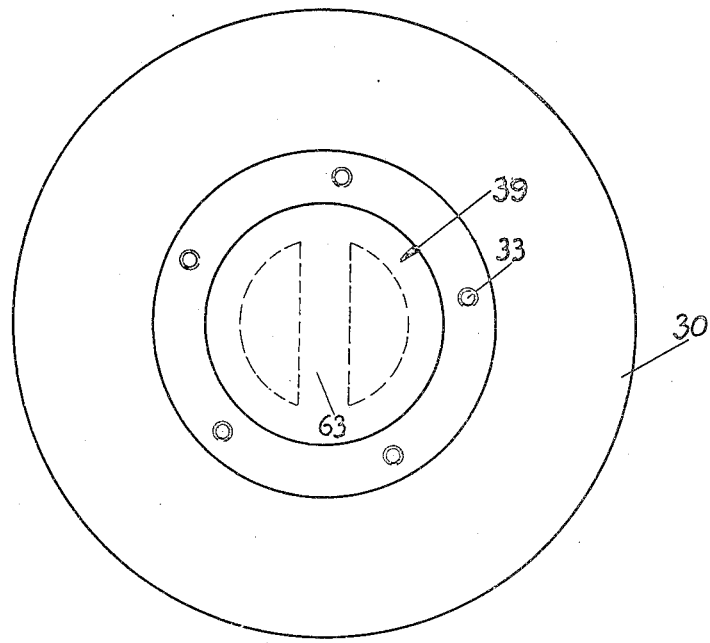
Figure 4:
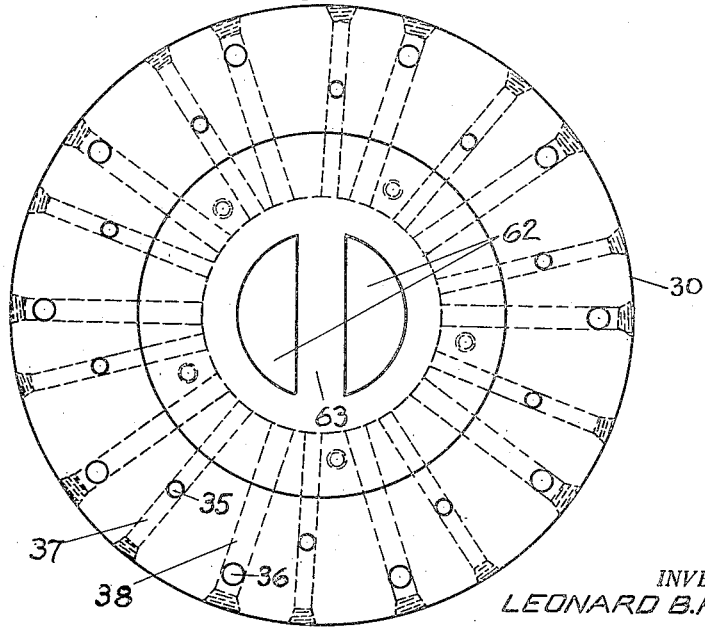
Figure 5:
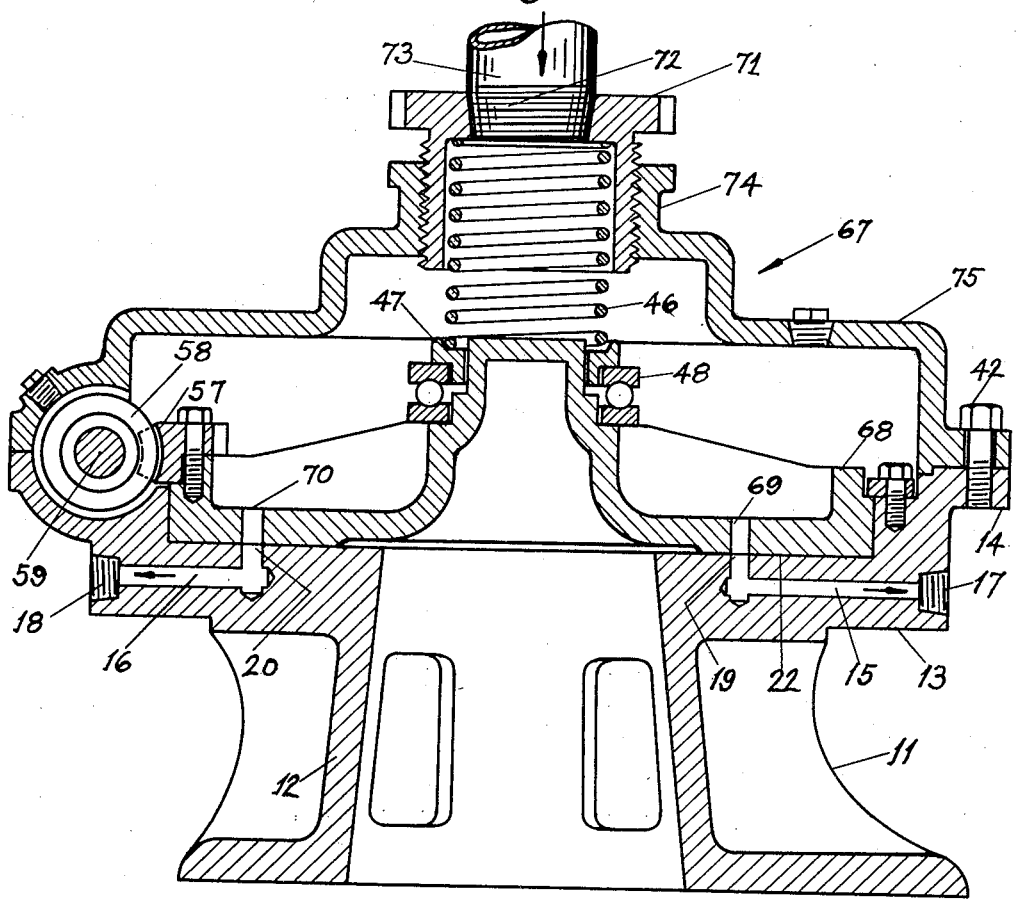

The invention will be hereinafter more particularly described, in connection with the accompanying drawings in which:

Fig. 1 is a central vertical sectional view through a preferred embodiment of the invention; Fig. 2 is a plan view of the apparatus shown in Fig. 1 with the cover and rotary member removed; Fig. 3 is a top view of the rotary member with the vertical spindle removed; Fig. 4 is a bottom view of the rotary member and Fig. 5 is a central vertical sectional view through a modified embodiment of the invention.

In the drawings reference character 10 indicates a timed sequence distributing and regulating apparatus which comprises a housing 11 having a hollow base portion 12, a recessed body portion 13, and a flange 14. The body portion 13 is provided with a plurality of radial outlet passages 15 and 16 having threaded outer ends 17 and 18, respectively. The outlet passages 15 and 16 terminate in axially directed apertures 19 and 20 spaced in concentric formation with the vertical axis of the apparatus.

The body portion 13 is provided with a recessed upper end 21 having a smooth or ground surface 22 forming a seat for a smooth or ground annular disk member 23. The annular disk member 23 is provided with a plurality of apertures 24 and 25, respectively, equal in number and size to the apertures 19 and 20 in the housing 11, and are disposed in an axial direction, in concentric formation with the vertical axis of the apparatus. The apertures 24 and 25 are adapted to register with the apertures 19 and 20.

The annular disk member 23 is also provided with a recessed upper end 26 having a smooth or ground face 27 forming a seat for the ground lower face 28 of a composite rotary member 29. The composite rotary member 29 comprises a disk shaped member 30 and a hollow spindle 31 fastened together by means of bolts 32, 32 passing through tapped holes 33 in the disk and through a flange or extension 34 on the hollow spindle 31. The disk member 30 is provided with a plurality of axial apertures 35 and 36, respectively, equal in size to, but of a lesser number than the apertures 24 and 25 in the annular disk member 23 or the apertures 19 and 20 in the housing 11. The apertures 35 and 36 connect with radial passages 37 and 38, respectively, leading to a central recess 39 in the disc 30.

A cover 40 having a flange 41 is fastened to the housing 11 by means of bolts 42 and a hollow threaded nut 43 having a central clearance hole 44 for the hollow spindle 31 is screwed into an internally threaded upper portion 45 of the cover 40. A compression spring 46 is interposed between the top of the hollow nut 43 and a recessed washer 47 seated in ball bearing 48 on the flange 34. The spring serves to press the rotary member 29 and the annular disk member 23 tightly against the ground surface 22 in the housing 11 and the threaded nut 43 serves to adjust the said spring pressure.

As shown in Fig. 2, all the axial apertures 24 and 25 in the disk member 23 register simultaneously with all the axial apertures in the housing 11. As shown in Figs. 3 and 4, the disk 30 of the composite rotary member 29 is provided with axial apertures 35 and 36 having respective radial passages 37 and 38 communicating with the central recess 39. The recess 39 communicates with the tubular aperture 49 in the hollow spindle 31 which is rotatably mounted in a stationary pipe support 50 having stuffing boxes 51, 51, an annular passage 52, radial inlets 53, and is fastened to the cover 40 by means of bracket arms 54. A plug 55 serves to close the upper end of the rotary spindle 31. A liquid under pressure entering the distributing apparatus 10 through a supply pipe 55

56, when all the axial apertures are in alignment, as shown in Fig. 1 will be constrained to flow through the radial inlets 53 and 53 into the central recess 39 and to flow out through the outlet passages 15 and 16.

A segment of a worm gear 57 is fastened to the disk member 23 and intermeshes with a worm 58 fixed on a shaft 59 disposed within bearings 60, 60. By operating the shaft 59 it is thus possible to cause a limited rotary displacement of the disk member 23 and to vary the degree of registry of the axial apertures 24 and 25 with apertures 19 and 20. Plates 61, 61 are fixed inside the body portion 13 of the housing 11 to act as stops for limiting the said rotary displacement of the disc member 23.

As shown in Figs. 1 and 4, the disk member 30 is provided with a bifurcated extension 62 forming a keyway 63 adapted for engagement with a key 64 that extends upwardly from a coupling 65 fixed to a drive shaft 66. When the shaft 66 rotates motion is imparted to the composite rotary member 29 and causes successive groups or multiples of the axial apertures 35 and 36, in the rotary disk member 30 to register with successive multiples of the axial apertures 24 and 25 in the stationary annular disk member 23. A liquid entering the supply pipe 56 under pressure is thus intermittently injected into multiples of the axial apertures in a timed sequence, the speed of which depends on the speed of the shaft 66. It is to be noted that due to the rotary motion multiples of radial outlet passages 15 and 16 are intermittently brought into communication with the source of supply without excessive noises and without strain upon the operating parts of the apparatus such as are occasioned by high pressure reciprocating pumps.

In the preferred embodiment of the invention the housing 11 may for example be provided with twenty-five large radial outlet passages 16 and twenty-five large axial apertures 20 in an outer circular row, and with twenty-five small radial outlet passages 15 and twenty-five small axial apertures 19 in an inner circular row. The annular disk member 23 will then be provided with twenty-five large apertures 25 and twenty-five small axial apertures 24 is similarly spaced circular rows. The rotary disk member 30 may then be provided with ten large apertures 36 and ten small axial apertures 35 in similar concentric circular rows. The apertures are so spaced that at a given instant five large apertures 36 and five small axial apertures 35 in the rotary disk member 30 are in alignment and feed their respective stationary apertures, and charge ten corresponding radial outlet passages 15 and 16. During each 36 degree displacement or one-tenth of a revolution of the rotary member 23 each rotary axial aperture injects into or charges in succession five stationary axial apertures and the twenty rotary axial apertures charge all the fifty stationary apertures in succession in multiples of ten. One revolution of the rotary disk member 23 thus causes all fifty radial outlet passages to be charged ten times, or a total of five hundred injections of fluid are delivered from the radial outlet passages 15, 16 for every revolution of the rotary disk member 23.

Referring to Fig. 5 which shows an embodiment of the invention in which there is a continuous distribution of a fluid from a single inlet to a plurality of outlets in regulated quantities, reference character 67 shows the assembled apparatus which comprises a housing 11 having a hollow base portion 12, a recessed body portion 13, spring parts 46, 47, 48, and gear parts 57, 58, 59, which are duplicates of that shown in Figs. 1 and 2. A disk member 68 is provided having a plurality of axial apertures 69 and 70 disposed in concentric formation around the vertical axis and adapted to register with the axial apertures 19 and 20 in the housing 11. An externally threaded plug 71 having a threaded hole 72 to receive a supply pipe 73 is screwed into an internally threaded upper portion 74 of a cover 75. The spring 46 serves to keep the disk member 68 tightly seated against the ground surface 22 in the housing 11 to prevent leakage of liquid therebetween. A liquid under pressure entering the distributing apparatus 67 through the supply pipe 73 when the upper and lower axial apertures are in alignment will be caused to flow out through the radial outlet passages 15 and 16 in continuous streams.

It will be noted that the diameters of the axial apertures in the outer row are larger than the diameters of the axial apertures in the inner row in proportion to their distances from the center of rotation. Due to the fact that the circumferential speed is greater at the outer row, it is necessary to thus proportion the sizes of the apertures in order to cause the apertures to remain open for the same period of time.

It will also be noted that the rotary member 29 of the timed sequence distributor 10 interrupts and subdivides the flow of the fluid to successive groups or multiples of the individual outlet passages 15 and 16 and to the leads 76 and causes a succession of impulses in these leads. The result thus obtained is similar to that produced by a plurality of individual single acting fluid measuring pumps arranged to operate in successive groups or multiples and in a timed sequence.

I claim:

1. A device for subdividing and distributing liquid in a timed sequence, said device comprising a hollow rotatable member having a fluid inlet through the hollow portion thereof and concentric rows of outlets communicating with said hollow portion, a stationary member having concentric rows of outlets, a stationary disk valve having a plurality of apertures and adapted for limited rotary displacement between said rotating member and stationary member to regulate the flow of fluid through said outlets, means for rotating said hollow member on said stationary disk valve and means for pressing said rotary member against said disk valve.

2. A device for subdividing and distributing liquid in a timed sequence, said device comprising a hollow rotatable member having a fluid inlet through the hollow portion thereof and concentric rows of outlets communicating with said hollow portion, a stationary member having a plurality of outlets, an annular stationary disk valve having concentric rows of apertures and adapted for limited rotary displacement between said rotating member and stationary member, means for rotating said hollow member on said stationary disk valve, a spring for pressing said rotating member against said valve to form a tight slip joint, and means for adjusting the tension of said spring.

3. A device for subdividing and distributing liquid in a timed sequence, said device comprising a stationary support, a hollow circumferentially movable member mounted in sealing engagement with said support and having a fluid inlet through the hollow portion thereof and concentric rows of outlets communicating with said hollow portion, a stationary member having concentric rows of outlets, an annular stationary disk valve having a plurality of apertures and adapted for limited rotary displacement between said hollow circumferentially movable member and said stationary member, means for circumferentially moving said hollow member on said stationary disk valve, a spring for pressing said circumferentially movable member against said valve and against said stationary member to form sealed joints, and means for adjusting the tension of said spring.

4. In combination, a hollow rotating spindle having a fluid inlet, a supporting base having a plurality of outlets, an annular disk valve adapted for limited rotary displacement between said spindle and said base, an extension on said spindle, a ball bearing supported by said extension, and a spring acting against said ball bearing and against said valve and base to form sealed joints.

5. A fluid distributing and regulating apparatus comprising in combination, a housing having concentric rows of fluid outlets, an annular disk member rotatably mounted in sealing engagement in said housing, said annular disk member having concentric rows of receiving and distributing means common to all of said outlets, means for causing a limited rotary displacement of said annular disk member whereby fluid is simultaneously apportioned to each of said outlets, a rotatable fluid supply member mounted above said annular disk member, and spring means in said housing reacting against said disk member to keep said member tightly seated in said housing, said fluid supply member being provided with receiving and distributing means adapted to supply fluid to the fluid outlets in said rows in succession.

6. A fluid distributing and regulating apparatus comprising in combination, a housing having concentric rows of fluid outlets, an annular disk member rotatably mounted in sealing engagement in said housing, said annular disk member having receiving and distributing apertures adapted to register with said concentric rows of outlets, means for causing a limited rotary displacement of said annular disk member whereby the degree of registry of said apertures is varied and fluid is simultaneously apportioned to each of said outlets in amounts from zero to the full area of said outlets, a fluid supply member mounted above said annular disk member, said fluid supply member being provided with receiving and distributing means adapted to supply fluid to the fluid outlets in said rows in succession, and spring means reacting against said disk member to keep said member tightly seated in said housing.

7. A timed sequence fluid distributing and regulating apparatus comprising in combination, a recessed housing having a plurality of radial outlets, a recessed annular disk member rotatably mounted in the recess of said housing, said annular disk member having fluid receiving and distributing means common to all of said outlets, means for causing a limited rotary displacement of said annular disk member whereby fluid is simultaneously apportioned to each of said outlets, a fluid supply member having an inlet and a plurality of outlets rotatably mounted in the recess of said annular disk member, spring means in said housing reacting against said fluid supply member to keep said member tightly seated in said annular disk member, and means for rotating said fluid supply member.

LEONARD B. HARRIS.